A. D. BRIXEY.
MEANS FOR PRODUCING PICTURES BY PROJECTED LIGHT.
APPLICATION FILED SEPT. 30, 1913.
1,204,401. Patented Nov. 14, 1916.
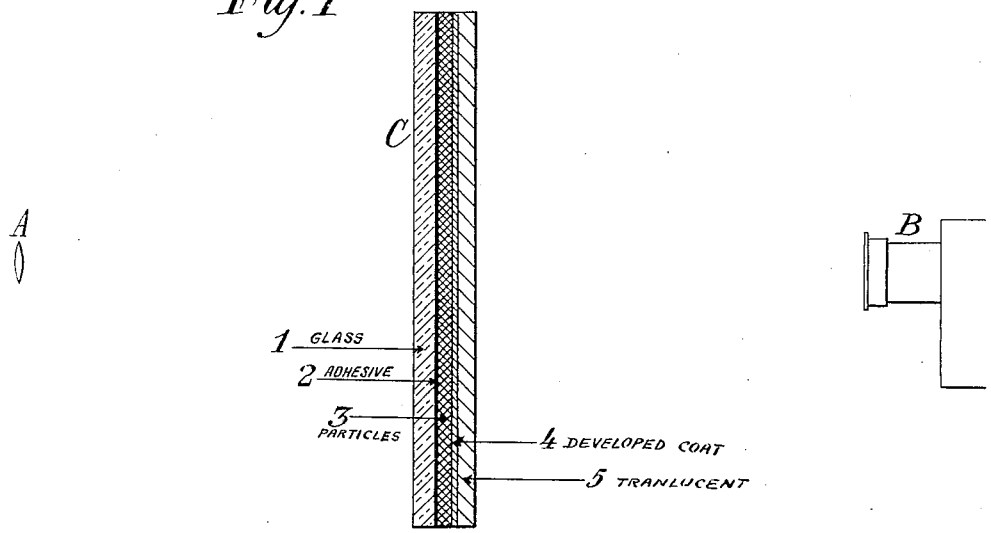
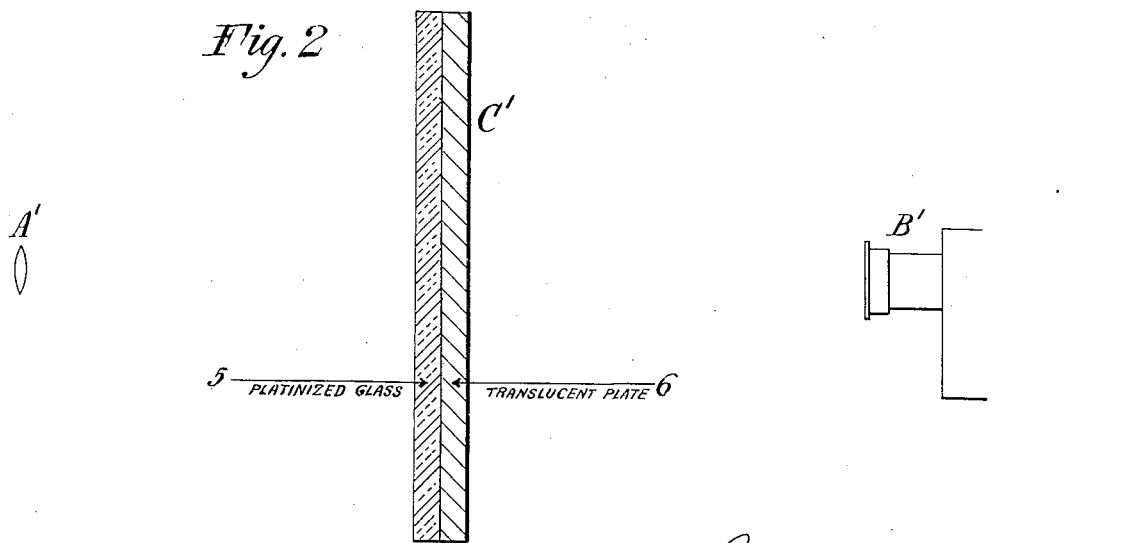
Witnesses:
J. Konigsberg
Peter A. Roe
Austin D. Brixey, Inventor
By his Attorneys
Edwards, Sager & Wooster

UNITED STATES PATENT OFFICE.

AUSTIN D. BRIXEY, OF NEW YORK, N. Y.

MEANS FOR PRODUCING PICTURES BY PROJECTED LIGHT.

1,204,401.  Specification of Letters Patent.  Patented Nov. 14, 1916.

Application filed September 30, 1913. Serial No. 792,570.

*To all whom it may concern:*

Be it known that I, AUSTIN D. BRIXEY, a citizen of the United States, residing at New York, in the county of New York and State of New York, have invented certain new and useful Improvements in Means for Producing Pictures by Projected Light, of which the following is a full, clear, and exact specification.

This invention relates to means whereby a picture, image or design may be reproduced at a distance through the instrumentality of projected light. It is of great value in relation to the reproduction of colored pictures (red, green, blue, etc.) but is not limited thereto.

With magic lanterns, moving picture projectors, etc., an intense light is projected through a slide or film bearing the picture or pictures. Also, the projected light for forming a picture at a distance may be projected by reflection of an intense light from the picture to be reproduced.

This projected light is directed against a screen from which it is reflected to the eye of the observer. The screen is usually white and opaque, but translucent screens, such as paper, cloth, ground glass, &c., may be used to reflect the projected light and produce the pictures. Also, pictures have been produced by rays reflected from a screen having a surface of a metallic nature. This last mentioned reflector returns the rays more perfectly than those before mentioned. The surface, however, is not white, but silvery.

All of the foregoing methods, which may be termed reflecting methods as the projected light is reflected back to the eye of the observer which is located upon the same side of the reflecting screen as the projector, are objectionable for the reason that with the character of screen as heretofore used the picture is dimmed, if not entirely destroyed, by reason of the fact that fugitive light is reflected from the surface so that such apparatus requires that the pictures shall be shown in an absolutely dark room. This is because the white portions are differentiated by reason of the varying intensity of the light on the different parts. With a white screen, such as an opaque white screen or a translucent screen as referred to, the screen being white any apparently dark or black portions are produced by comparison with more intense light upon other portions. Any foreign rays, therefore, interfere with the comparative intensities of the projected light and vary in their effect from rendering the picture somewhat dim where the foreign light is not intense to rendering the picture substantially invisible in daylight. In the case of the metallic surface reflector referred to, the white parts of the picture depend upon the whiteness and intensity of the projected light to produce the white parts of the picture as the surface itself is not really white. Foreign light rays, therefore, interfere with the comparative intensities of the projected light to the dimming or destroying of the picture.

Pictures have also been rendered visible at a distance by means of projected light by the use of translucent screens which are viewed from the opposite side of the screen from the projector. It will be apparent that by this method the projected rays are not reflected as in the reflecting methods before referred to, but proceed on a straight line to the eye. The picture is fixed at the surface of the translucent material by reason of the diffusion and refraction of the rays of light by the translucent material. In contradistinction to the reflection methods of picture producing, as above referred to, this method by which the screen is placed between the projector and the observer may be termed the transmission method, for while the light is reflected from the picture screen in the reflection methods it is transmitted through the screen by the transmission method. The common form of translucent screen used in the transmission method is of ground glass. The transmission method, as heretofore employed, also has the objection that its pictures are liable to be dimmed or destroyed by foreign light rays which are reflected from the surface of the screen to the eye of the observer, or which may be transmitted through the screen. This interferes with the relative intensities of the different rays of the light from the projector in producing lights or shades in a manner similar to that described in connection with the reflection methods, so that this transmission method also requires the picture exhibition to be located in a dark place.

The transmission method, as heretofore employed, also has this disadvantage that the picture thereon is only perfect and most brilliant when viewed from a place directly in front. The pictures lose their definition and brilliancy rapidly as the eye of the observer moves to one side and the angle which the line of sight makes with the picture plane decreases.

With both the transmission and reflection methods, as heretofore employed, it is apparent to the observer that the picture is produced by a brilliant light. This being due to the fact that the picture is lighted at all points and intensely lighted at some points to bring out the contrasts of light and shade. This intense brilliancy which is necessary to definiteness of the picture is extremely trying to the eyes especially in moving pictures. This is in marked contrast to the ordinary opaque picture, such, for instance, as an oil painting, which produces a definite picture with ease to the eyes and without extreme intensity of light. This ordinary picture is an opaque surface of reflection and subtraction which produces the white effect upon the eyes by reflecting all of the light and a black effect when all the light has been absorbed, while intense and gradual colors are produced by the absorption of the other colors of the spectrum.

It is the object of the present invention to provide means for producing pictures from projected light which shall be free from the disadvantages as noted above with reference to the means heretofore employed.

It is an ancillary object of the invention to produce pictures from projected light which shall have the opaque effect of ordinary pictures of reflection and subtraction.

A further ancillary object of the invention is to provide means whereby projected light pictures may be exhibited in the light as well as in the dark.

A further ancillary object of the invention is to provide a picture producing means, wherein the picture shall be of substantially the same definition and brilliancy when viewed from any angle.

Other objects of the invention will appear hereinafter.

The invention can be best described and its application illustrated in connection with the accompanying drawings, of which—

Figure 1 is a view showing the picture producing device in section, the projector and the eye of the observer being conventionally shown; and Fig. 2 is a section of a modified form of picture producing device.

Referring to the drawings and first to Fig. 1, the eye of the observer is indicated at A, the projector at B, and the picture visualizing device at C. The projector may be of any suitable or well known construction. The device C comprises a plate of ordinary glass 1, as indicated, upon one side of which is spread a suitable transparent pitchy coating 2. Over the adhesive coating 2, and secured to the glass plate 1 thereby is a coating 3 formed of colored particles of starch (which may be ordinary potato starch), or other suitable pulverulent and transparent materials. These particles are colored by means of colors, also transparent, in red, green, and blue. These particles are mixed together as intimately as possible in the state of a dry powder and then applied to the glass. The particles should ordinarily be from 1/1200 to 1/2000 of an inch in diameter and mixed in the proportion of four green to three red to two blue. This combination of transparent colored grains when applied to the glass has been found in practice to properly transmit the light and does not communicate to the surface any appreciable coloration. This result may be also obtained and a satisfactory coating secured by mixing together pulverulent and transparent particles of other grains than red, green and blue, as for instance, red, yellow, and blue particles, or orange, green and violet, or even in any number of colors such that when these different groups of colors are mixed and applied to the plate as described they do not give any appreciable coloration thereto.

The mixture of powdered colored particles is so applied to the glass that the grains remain fixed thereon and touch each other, but without being superposed, so that the layer is as uniform and continuous as possible. To form a continuous coating comparatively large particles of the powder may be first sprinkled upon the plate and then the interstices may be filled in by a second sprinkling of smaller particles of powder having different colors mixed together as above referred to. Even then there may be some interstices by which light could pass through the coating without traversing the colored particles. To avoid this the coating may be dusted with a very fine black powder of a suitable substance, such as charcoal, so that any remaining spaces not filled by the colored particles are rendered opaque. The whole particle coat is then covered with a coating of protecting transparent varnish. This varnish as well as the transparent adhesive matter 2, should have an index of refraction as near as possible to that of the colored particles in order that the light may not be diffused in passing through the particle coating.

Upon the varnished coating just described is a developed sensitive panchromatic coating 4, but this coating is a refinement and may be omitted as will be hereinafter referred to. Over the coatings referred to is placed a translucent white screen 5, which may be secured in position by clamping or in any other suitable manner. This translucent screen may be of cloth, paper, ground glass, or other suitable material.

The device treated with the transparent colored starch particles as described is substantially non-reflecting, that is substantially all light coming from the oposite side of the device from the projector, and which would otherwise be reflected to the eye of the observer, is absorbed so that unless these particles are lighted from rays from the projector side the device will appear substantially black or without light to the observer. Since these particles are of a transparent nature, however, light rays from the projector will be made visible at appropriate particles of the screen, according to their colors. Assuming that the particles are colored red, blue and green, a white ray from the projector will have its red portions made visible at the red particles, its green portion at the green particles, and its blue portion at the blue particles, the red rays not being transmissible through the green or blue particles and so on with the other colors, the constituent colored portions of the white rays being transmitted by the particles of different color as described. These particles are so minute and so intimately associated together that the separation of the colors is not apparent and they blend together so that the portion of the screen surface under consideration will appear white to the observer. Blue rays from the projector will be blocked off by the red and green particles, but will render the blue particles luminous and so with the other colored particles and their corresponding colors.

As before stated, the coating 4 may be omitted. The device C will then perform its functions in producing the picture by transmitted light substantially as well as by the use of this coating. I have found that where this coating is absent the "white" portions of the picture upon the screen are not exactly a true white, but have a slightly grayish tinge. In order to produce a perfect white, a plate comprising the glass plate and the starch and charcoal particle coating thereon and with the sensitized coating over that, as shown in the device C, may be treated by taking a picture of a perfectly white screen in the manner of taking an ordinary photograph. The exposure being made with the plate so placed that the particle screen coating is interposed between the sensitive coating and the object glass. After exposure, development and fixing, the silver reduced in the sensitive coating will mask to different degrees the colored elements of the screen coating according to the colors of the object photographed, which in this case is white, and the result will be that with the exposed sensitized coating developed the transmitted light will be of colors complementary to those of the light which they have received during the exposure.

To restore the normal order the negative may be inverted by any of the known methods, such as treatment with the permanganate or bichromate of potash acidulated and so forth, followed by a second development in a well known manner. This plate, which is a positive, is then combined with the translucent screen to form the picture visualizing device C when the white portions will be a perfect white. As before stated, however, this is merely a refinement and the device C is near enough to true color for most practical purposes without the use of the developed sensitized coating. The glass plate 1 may also be omitted, the particle coat 2 being secured to the translucent screen 5.

With the observer's eye, the picture producing device C and the projector B arranged as shown in Fig. 1, and with no light proceeding from the projector, the observer will note a dark blank space on the picture producing device, which is substantially non-reflecting. If now the light is projected from the picture to be reproduced, the rays emanating from this picture and striking the device C will be white or black or of intermediate shades and of different colors according to the different portions of the picture from which they are projected. These projected rays will cause the device C to turn different colors and shades in different parts according to the different parts of the picture to be reproduced and from which the light is projected. In other words, the blank dark screen is changed from its color as appearing to the observer by reflected light (or the lack of it) to those colors and shades in the various parts which produce a clear and opaque picture in its true shades and coloring. This picture which appears to the observer upon the surface of the mixed colored particles on the side adjacent to the glass 1, is a perfect "replica," as has been noted, of the original picture and I have in practice, therefore, referred to such a picture as a "repliture," which I define as a picture produced by light on a surface having the appearance of an ordinary subtracted reflected picture. The phenomenon whereby such a picture is brought about I have referred to as "repliturance," which I define as the change in color of a surface or substance by reflected light to a different color by transmitted light with an opaque effect and the picture visualizing device whereby such "repliture" and "repliturance" are brought about I have characterized a "repliturant," meaning a surface or substance appearing to have a different color by reflected light from what it does by transmitted light and which can be changed to any color by appropriate transmitted light, the surface or substance having the appearance of being opaque.

The picture produced by the apparatus as described, owing to the effect of no light being transmitted through it except that actually projected from the picture, is relieved of the intense brilliancy heretofore noticed in projected pictures, clearly indicating that they are produced by intense light so that the effect is very pleasing and not tiresome to the eyes. The pictures can be exhibited in light, even in broad daylight, as the picture surface is substantially non-reflecting so that reflected foreign light does not interfere with the picture. Also, the definiteness and brilliancy of the picture is maintained even when observed from one side at which the line of vision makes a very small angle with the picture plane. The reason for this, as I understand it, being that each of the colored particles becomes a center of luminosity by reason of the light from the picture, which is projected upon it, and is, therefore, of the same intensity from whatever angle viewed. Also, this luminous point is fixed in position by reason of the illuminated particle being fixed in position and the light therefrom confined against diffusion through the surface and adjacent particles which do not transmit the particular character of light.

Referring now to Fig. 2, A' is the eye of the observer, B' represents the projector, and C' is the picture visualizing means. In this case, however, the picture visualizing means comprises a piece of platinized glass 5 and a white translucent screen 6, which may be of ground glass or other suitable translucent material.

The platinized glass may be formed as follows: a concentrated solution of platinum is brought to the state of crystallizable chlorid upon which is poured essential oil of lavender. A liquor is formed in which the platinum is held in suspension, and which is placed upon the glass in very thin layers by means of a pencil. Especial care must be taken to avoid dust which is very detrimental to an operation of this kind. The glass having been thus coated is put into a drying room and then into a muffle of refractory earth or of cast iron. The muffle is hermetically sealed and raised to a red heat. After cooling the glass is taken out. The surface may then be made very bright by rubbing with a cloth and Spanish white.

The platinized glass is readily transparent to transmitted light and with the arrangement of apparatus, as shown, produces a "repliturant" effect as before referred to when light is projected from the picture to be reproduced through the device C' to the eye of the observer. The platinized face of the glass should be next the translucent substance.

What I have characterized as "replipturance" herein is easily distinguished from the effect produced by a regular transparency as it does not give the impression of being produced by light, but rather that one is observing an ordinary picture hanging upon the wall or, in other words, a picture of reflection and subtraction.

While the invention has been illustrated in what is considered its best applications it may be embodied in other structures without departing from its spirit and is not, therefore, limited to the structure shown in the drawings.

Having thus described my invention, I declare that what I claim as new and desire to secure by Letters Patent is:—

1. The combination with a projector for projecting light from a picture to be reproduced, of a translucent light diffusing screen for receiving the projected rays, and a reflection-reducing screen or coating of intermixed particles of different colors for transmitting the projected light from the translucent screen to the observer's eye.

2. The combination with a projector for projecting light from a picture to be reproduced, of means for visualizing the picture projected comprising a translucent light diffusing screen, a coating or screen of intermixed transparent particles of different colors, and a developed sentized coating, developed after exposure to a white surface through the particle screen, the negative being then reversed.

3. The combination with a projector for projecting light from a picture to be reproduced, means for visualizing the picture projected, comprising at translucent light diffusing screen and a reflection-reducing light transmitting screen having minute areas of different colors intermixed.

4. A means for producing a picture from projected light comprising a translucent light diffusing screen, a coating or screen of intermixed transparent particles of different colors, and a developed sensitized coating, developed after exposure to a white surface through the particle screen, the negative being then reversed.

5. The combination with a source of light, of means for receiving and transmitting light from said source to the eye of the observer, said means comprising a translucent light diffusing screen, a coating or screen of intermixed transparent particles of different colors and a developed sensitized coating, developed after exposure to a white surface through the particle screen, the negative being then reversed.

6. A means for receiving and transmitting light from a source of light to the eye of an observer, comprising a translucent light diffusing screen and a reflection-reducing screen having minute areas of different colors intermixed.

7. A means for receiving light from a source of light and transmitting the same from said source to the eye of the observer, comprising a translucent light diffusing screen and a reflection-reducing coating or screen of intermixed transparent particles of different colors.

In testimony whereof I affix my signature, in presence of two witnesses.

AUSTIN D. BRIXEY.

Witnesses:
   Thomas Howe,
   Geo. N. Kerr.